United States Patent [19]

Diepers et al.

[11] 4,361,775

[45] Nov. 30, 1982

[54] CURRENT TRANSFER BRUSH

[75] Inventors: Heinrich Diepers, Höchstadt; Horst Müsebeck, Erlangen, both of Fed. Rep. of Germany

[73] Assignee: Siemens Aktiengesellschaft, Berlin and Munich, Fed. Rep. of Germany

[21] Appl. No.: 239,586

[22] Filed: Mar. 2, 1981

Related U.S. Application Data

[63] Continuation of Ser. No. 29,127, Apr. 11, 1979, abandoned.

[30] Foreign Application Priority Data

Apr. 20, 1978 [DE] Fed. Rep. of Germany ....... 2817317

[51] Int. Cl.[3] ............................................ H02K 13/00

[52] U.S. Cl. .................................... 310/248; 310/239

[58] Field of Search ............................... 310/248-253, 310/232, 233, 236, 237, 239; 13/18 R; 314/60; 313/357

[56] References Cited

U.S. PATENT DOCUMENTS

| | | | |
|---|---|---|---|
| 990,951 | 5/1911 | Barbour | 310/248 |
| 1,448,511 | 3/1923 | Becker | 310/248 |
| 1,548,466 | 8/1925 | Hettinger | 310/248 |
| 1,878,323 | 9/1932 | Quist | 310/248 |
| 3,668,451 | 6/1972 | McNab | 310/248 |
| 3,886,386 | 5/1975 | Hillig | 310/251 |

FOREIGN PATENT DOCUMENTS

| | | | |
|---|---|---|---|
| 2406516 | 8/1975 | Fed. Rep. of Germany | 310/251 |

*Primary Examiner*—R. Skudy

*Attorney, Agent, or Firm*—Kenyon & Kenyon

[57] ABSTRACT

A current transfer brush with a multiplicity of fibers of graphite which are combined to form a slider member and extend at least approximately perpendicular to the contact surface of the brush, having parts of electrically conductive material, in which the fibers comprise graphite fiber bundles, each of which is twisted with filaments of electrically conductive material giving the advantages of ease of twisting and permitting the ratio of metal to graphite in the brush to be predetermined.

16 Claims, 2 Drawing Figures

CURRENT TRANSFER BRUSH

This is a continuation, of application Ser. No. 029,127 filed Apr. 11, 1979, now abandoned.

BACKGROUND OF THE INVENTION

This invention relates to current transfer brushes in general and more particular to a current transfer brush with a multiplicity of fibers which are combined to form a slider member and extend at least approximately perpendicular to the contact surface of the brush, the brush having parts of electrically conductive material.

The brushes in electric machines are used for transfering current between a stationary machine part and a rotating machine part. By using graphite, good electric conductivity and, at the same time, good sliding properties on the contact member connected to the rotating machine part, for instance, a slip ring or a commutator, are ensured. The running properties of such a brush are determined mainly by the friction coefficient $\mu$ as a function of the circumferential velocity of the contact member connected to the rotating machine member and by the voltage drop $\Delta U$ as a function of the current density transferred via the brush. Both quantities depend heavily on the extraneous skin formed on the rotating contact member, which is also called film or patina. This extraneous skin is composed of the materials of the slider member of the brush and the contact member abraded during operation. Its thickness and nature is influenced by a multiplicity of factors. Thus, it is determined, for instance, by the material composition of the graphite in the brush and of the contact member, by the current density provided, as well as by the circumferential velocity and the temperature of the contact member. In addition, it depends on the contact pressure of the brush and also on the ever changing influences of the atmosphere and altitude climate, the humidity of the air and chemically agressive gases and vapors.

The slider members of such graphite brushes can contain a multiplicity of fibers of carbon or graphite which are combined in a bundle and are coated with a metal film of high electric conductivity (British Pat. No. 1,191,234). In this case graphite fibers in the form of a rope with several thousand individual fibers are used as the starting material. Such fibers are known, for instance, from the British patent No. 1,110,791. The advantages of these fiber brushes over the known brushes with an electro graphite block are that there are substantially more contact points between the slider member and the rotating contact surface, the fibers are highly elastic, and the electrical data and the mechanical running properties of the brush are improved thereby.

Metallizing the individual graphite fibers, however, is relatively expensive. With the known methods for electroless or electroplating deposition, furthermore, only a limited choice of metals can be applied to the graphite fibers. With these chemical methods, there is, in general, the difficulty that the electrically conductive material to be applied does not adhere well to the graphite material. Therefore, precoating with a substrate material which adheres better is often necessary, on which, in a further process step, the desired electrically conductive material can then be deposited. With this method, there is also the danger that individual fibers will stick together during the coating process and thus, nonuniform coating is obtained. Because of these difficulties, physical methods are preferred. Especially advantageous is metallizing the fibers by ion plating. Ion plating is understood to be a an evaporation process, in which the atoms or molecules to be deposited are partially ionized in a plasma and impinge on the graphite member to be coated in an electric field with higher energy ("Vakuumtechnik," 1976, pages 65 to 72 and 113 to 120). In this process, the substrate, which is necessary, for instance, with electro deposition methods, can be dispensed with. In addition, a relatively uniform coating of all fibers of a fiber bundle is possible without the need for additional measures. Suitable apparatus for the coating of the graphite fibers of a fiber bundle is relatively expensive, however.

With the known coating methods, moreover, only relatively small layer thickness of electrically conductive material can be applied to the individual fibers. It is therefore possible to adapt a brush composed of such fibers to the pecularities of different types of machines only to a limited extent. Thus, for instance, the ratio of metal to graphite cannot be set arbitrarily without additional special measures.

SUMMARY OF THE INVENTION

It is therefore an object of the present invention to provide a current transfer brush, in the manufacture of which these difficulties do not occur or in which they occur only to an insignificant extent. It should, in particular, be possible to manufacture this brush simply and therefore inexpensively and to vary the metal-to-graphite ratio of its slider member easily without additional measures.

According to the present invention, this problem is solved for a current transfer brush of the type mentioned at the outset by providing a slider with graphite fiber bundles which are twisted with filaments of the electrically conductive material.

The advantages of this design of the current transfer brush are in particular that the twisting of the graphite fiber bundles can easily be performed by known methods. An extremely large variety of adaptions to different types of machines is provided without additional measures by selecting, for instance, the filament thickness, the type of material or the ratio of metal filaments to graphite fibers. Current transfer brushes with large current densities and high circumferential velocities of the rotating contact members and little wear can be made in this manner. The good current conduction necessary is ensured by the metal filaments and the elasticity by the graphite fibers.

In particular, graphite fibers of highly graphitized graphite are used. Such a graphite is understood to be a graphite material which contains a large percentage of crystallized graphite. This material is especially suited for brushes, as it has very good sliding properties on metallic contact members such a slip rings or commutators.

The graphite fibers used advantageously have a high modulus of elasticity which, in particular, is higher than $2\times10^{11}$ N/m$^2$. Such fibers can be twisted with the metal filaments relatively easily without danger of microscopic cracks due to local overstrain.

According to further embodiment of the current transfer brush according to the present invention the danger of such local overstrain can be kept low, in particular, if the graphite fiber bundles are provided as a core, around which the filaments of the electrically conductive material are wound.

DETAILED DESCRIPTION OF THE INVENTION

Figure 1:
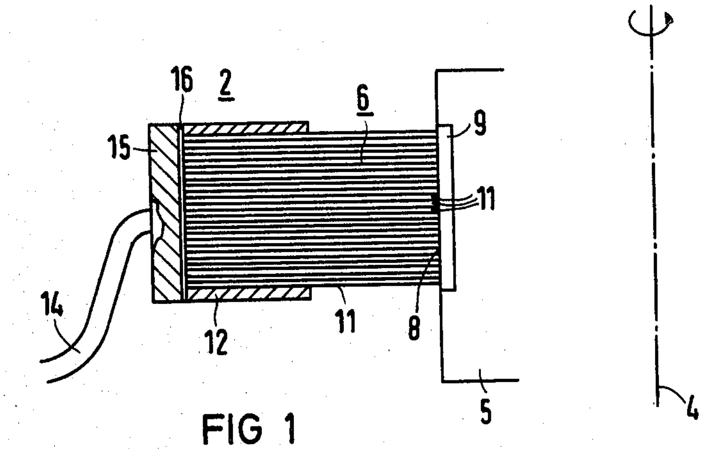
FIG. 1 is a schematic depiction of a current transfer brush according to the present invention.

The brush 2 shown in FIG. 1 in a cross section is rigidly connected to a stationary machine part, not further detailed, of an electric machine. To transfer current between this stationary machine part and a machine part 5, merely indicated in the figure, rotating about an axis 4, the brush 2 with its slider member 6 slides on the cylindrical outer or running surface 8 of a contact member 9 connected to the rotating machine part 5. It will be assumed, for instance, that the running surface 8 is the contact surface of a commutator 9 of a commutator machine. However, the running surface 8 can also be the contact surface of a slip ring of a d-c or a-c machine.

Figure 2:
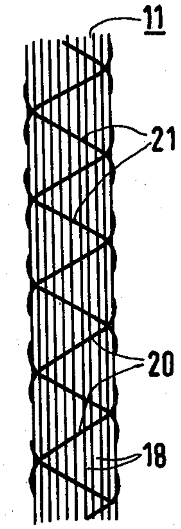
FIG. 2 shows an individual fiber bundle of this brush.

The slider member 6 of the brush 2 contains a multiplicity of graphite fiber bundles 11, of which one bundle is shown in detail in FIG. 2. According to the presentation of FIG. 1, the brush 2 is arranged, with respect to the running surface of the corotating commutator 9 of the machine, in such a manner that its graphite bundles 11 are perpendicular to this running surface 8. The ends of these bundles facing away from the rotating machine part 5 are mechanically held together by a frame element 12, for instance, a copper frame and are thus combined to form the slider member 6. These ends are generally difficult to join to a current feed or take-off lead by soldering. It is therefore provided that these ends are connected to a copper plate 15 connected to the current feed or take-off lead, for instance, a copper cable 14, in an electrically conducting manner by means of a layer 16 of conductive adhesive. Suitable conductive adhesives are, for instance, conductive silver pastes, conductive epoxy adhesives or conductive silicone adhesives, which contain electrically conductive material in finely powdered form and are hardened by a heat treatment or also at room temperature.

In FIG. 2, part of a graphite fiber bundle 11 of the current transfer brush according to the present invention is illustrated in detail in a side view. The graphite fiber bundle 11 represents a rope of several hundred to several thousand, but preferably at most 1000, individual graphite fibers 18, of which only a few are detailed with exaggerated thickness in the figure. Each graphite fiber 18 has, for instance, a diameter which is less than 50 μm and preferably less than 10 μm. It is, in particular, a so-called high-modulus fiber with a large modulus of elasticity which is preferably higher than $2\times10^{11}$ $N/m^2$. The graphite is advantageously a highly graphitized graphite. This material contains a large percentage of crystallized graphite and is particularly well suited for brush slider contacts since it has very good sliding properties on metallic contact members such as slip rings or commutators.

The graphite fiber rope 11 represents a straight graphite core, around which filaments of an electrically conductive material are wound with a predetermined pitch. According to the embodiment of FIG. 2, it is assumed that first, a predetermined number of metal filaments 20 are wound clockwise around the graphite fiber rope 11 and a corresponding number of metal filaments 21 is wound counterclockwise about the rope wrapped in this manner. In this manner, a net-like structure incorporating the metal filaments 20 and 21 of the electrically conductive material is made on the outside surface of the graphite fiber rope 11 the conductive material extends up to the contact surface of the running surface 8 of the brush. Preferred is cabling with the graphite fiber rope 11 as a long, straight core, around which the metal filaments 20 and 21 are wound. However, the graphite fiber rope 11 itself can be made with a lay. Advantageously, a smaller pitch is preferred in order to avoid microscopic cracks by locally overstraining the graphite fibers 18.

The metal filaments 20 and 21 are made of electrically highly conductive materials such as copper, silver or of alloys of copper and silver with each other or with other components, with a filament thickness of less than 500 μm and preferably less than 100 μm. The choice of the alloy components can be made so that, for instance, corrosion of silver or copper under certain external conditions is prevented. In addition, metal filaments with corrosion protection layers can also be provided. Instead of an alloy, clad conductors can also be used, which have, for instance, a copper core and a silver jacket. Such a clad conductor can also contain a core and, correspondingly, a jacket of a material which improves, in addition to the graphite, the sliding between the brush 2 and the rotating running surface 8, or reduces the abrasion. A lubricant can thus be fed in advantageously in a continuous manner in the course of the abrasion. This is of advantage particularly under very dry climatic conditions, under which graphite is known to have a considerably less lubricating action and more abrasion.

In the brush according to the present invention, the choice of the metal filament thickness, the ratio of the number of metal filaments to the number of graphite fibers of a graphite fiber bundle as well as the manner of twisting such as changed pitch angles or multi-layer contrarotating twist can be varied within wide limits. In addition, graphite fiber bundles which are twisted with different numbers of metal filaments or with filaments of different materials can also be provided. Because of these possibilities of variation, the brush according to the present invention can be optimally adapted to the peculiarities of a particular type of electric machine through only slight changes in the manufacturering technique, as far as their electrical as well as mechanical properties are concerned. In this manner, locally different current densities can also be intentionally adjusted within the slider member 6 in a simple manner. Thus, unwrapped graphite fiber bundles or bundles thinly wrapped with less conductive material, which therefore have higher resistance, can be used, for instance, at the trailing and leading edge. Especially for application as a commutator brush, it may be of advantage to provide metal filaments of a high melting point material with a vapor pressure which is low at higher temperatures, in order to make the formation of sparks at the trailing edge of the brush more difficult and to transfer less brush material.

By twisting the graphite fiber ropes 11 with the electrically conductive material of the metal filaments 20 and 21, a sort of composite brush is produced, where the electrically conducting parts of brush provide particularly good current conduction with low resistance and the graphite parts of the brush act as carrier material for these electrically conducting metal filaments 20 and 21 as well as a lubricant. The heat generated at the contact surface during the operation of the machine can be removed quickly along the metal filaments in a direction toward the brush frame 12, so that the contact temperature is kept correspondingly low, especially under loads which are several times higher than the load limits of brushes used heretofore. In addition, the electrical loading of the brush, for instance, its current density, can be increased to several times the load limit of the brushes used heretofore, even at velocities of 80 m/sec. The brush according to the present invention can therefore be used to advantage in top-performance turbo-generators.

According to one example, a current transfer brush according to the present invention contains 1480 graphite fiber ropes with 2500 fibers each. The fiber thickness is about 7 to 8 $\mu$m. Commercially available graphite fibers are provided as the fibers (Sigri Electrographite GmbH, D-8901 Meitingen; Sigrafil HM). Each of these graphite fiber ropes it twisted with 16 silver wires, the diameter of which is 38 to 42 $\mu$m. Of these, 8 silver wires are wrapped clockwise and 8 silver are wrapped counterclockwise around the graphite fiber rope. The graphite fiber ropes are held in a copper frame with a square inside opening of $2 \times 2$ cm and connected electrically to a copper cable by means of a conductive silver paste. A slip ring of steel with an electro deposited silver layer, which turns under the brush at a speed of revolution of 63 m/sec is provided. As the contact member of a rotating machine part with a current density of, for instance, 30 A/cm$^2$, a voltage drop $\Delta$ U of approximately 0.3 V over the entire brush including the contact zone is then obtained for minus polarity.

What is claimed is:

1. A current transfer brush comprising a slider member comprised of a plurality of graphite fiber bundles extending at least approximately perpendicular to the contact surface of the brush, each of said plurality of fiber bundles containing individual filaments of electrically conductive material twisted with said graphite fiber bundles and extending up to said contact surface of said brush, and a frame element retaining only the ends of said bundles facing away from the contact surface of said brush.

2. A current transfer brush according to claim 1, wherein said graphite fiber bundles are made of highly graphitized graphite.

3. A current transfer brush according to claim 1, wherein said graphite fiber bundles have a large modulus of elasticity.

4. A current transfer brush according to claim 3, wherein said graphite fiber bundles have a modulus of elasticity larger than $2 \times 10^{11}$N/m$^2$.

5. A current transfer brush according to claim 1, wherein said graphite fiber bundles form a core, around which the filaments of the electrically conducting material are wound.

6. A current transfer brush according to claim 1, wherein said graphite fiber bundles each have at least 100 and at most 5000, and preferably, at most 1000 graphite fibers with a fiber diameter of under 50 $\mu$m and preferably, under 10 $\mu$m.

7. A current transfer brush according to claim 1, wherein said filaments are selected from the group consisting of copper, silver and an alloy containing at least one of these materials.

8. A current transfer brush according to claim 1, wherein said filaments of the electrically conductive material have a filament thickness of under 500 $\mu$m and preferably, under 100 $\mu$m.

9. A current transfer brush according to claim 1, wherein said slider member includes graphite fiber bundles twisted with filaments of the electrically conductive material, and graphite fiber bundles without such twisting.

10. A current transfer brush according to claim 1, whrein said slider member is comprised of a plurality of graphite bundles in which different bundles have a different number of graphite fibers.

11. A current transfer brush according to claim 1, wherein said slider member is comprised of different graphite fiber bundles having a different number of the filaments of the electrically conductive material twisted therewith.

12. A current transfer brush according to claim 1, comprising different graphite fiber bundles which are twisted with filaments of different electrically conductive materials.

13. A current transfer brush according to claim 1, wherein said filaments of the electrically conductive material are enclosed by a layer of a corrosion protection material.

14. A current transfer brush according to claim 1, wherein said filaments contain a friction reducing material.

15. A current transfer brush according to claim 1, wherein said filaments contain a high melting point material.

16. A current transfer brush according to claim 1, and further including a current lead and a conductive adhesive establishing contact between the filaments of electrically conductive material and said current lead.

* * * * *